Feb. 28, 1967 H. R. BARKEMEYER ET AL 3,306,713

SEMICONDUCTOR PROCESS AND PRODUCTS PRODUCED THEREBY

Filed Sept. 18, 1962

INVENTORS
HENRY R. BARKEMEYER
WILLIAM J. McALEER
PETER I. POLLAK
BY Walter Katz
ATTORNEY 3,306,713
SEMICONDUCTOR PROCESS AND PRODUCTS PRODUCED THEREBY Henry R. Barkemeyer, North Plainfield, William J. McAleer, Madison Township, and Peter Immanuel Pollak, Scotch Plains, N.J., assignors to Merck & Co., Inc., Rahway, N.J., a corporation of New Jersey Filed Sept. 18, 1962, Ser. No. 224,486
6 Claims. (Cl. 23—315)

Figure 1:
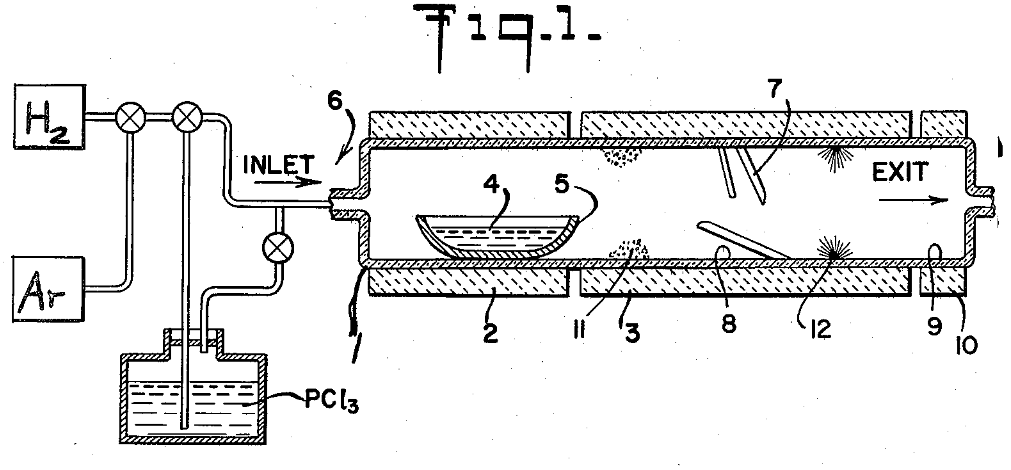

This invention relates to crystal blades of semiconductor material and, more particularly, to a method of making semiconductor material having this useful crystal form.

While the term "semiconductor material" traditionally has denoted certain elements of the Group IV series in the periodic system, such as germanium, silicon, and silicon carbide, it is presently known in the art that compounds of the Group III–V elements, such as gallium arsenide, indium phosphide, gallium phosphide, and the like, also exhibit semiconductive characteristics in the same manner as germanium and silicon. Examples of such compounds and details with respect to their semiconductive characteristics are illustrated in U.S.P. No. 2,798,989, issued July 9, 1957, to Welker. In addition to the compounds formed of two elements, one from Group III and one from Group V, it is known that semiconductor compounds of similar nature may be formed from polyelemental compounds of the general formula $$(A_xB_{1-x})^{III}(C_yD_{1-y})^{V}$$

where A and B are different elements but both of Group III, i.e., boron, aluminum, gallium, indium or thallium, and C and D are different elements but both of Group V, i.e., nitrogen, phosphorus, arsenic, antimony or bismuth, and where the subscripts $x$ and $y$ denote atom proportions whose values can change from zero to unity, inclusive. Examples of such compounds known to exhibit semiconductive properties are $Ga_2AsP$, $GaInSb_2$, AlInPAs, $Ga_{0.4}In_{0.6}P$. Further examples are discussed in U.S.P. No. 2,858,275 issued October 28, 1958, to Folberth.

It is appreciated that the number of compounds which may be formed from the Group III–V elements is substantial, which, theoretically at least, enables one to obtain a suitable combination of characteristics for substantially any semiconductor application desired. For example, compounds may be formed which will exhibit semiconducting characteristics intermediate between silicon and germanium so far as energy gap, carrier number and carrier mobilities are concerned.

The techniques for preparing elemental semiconductor bodies, such as germanium, silicon and silicon carbide have been well established in the art. Typically, the preparation of crystals of these elements is carried out by solidification from the molten state. The compounds of the Group III–V elements also are commonly fabricated by forming a melt of the specific Group III element and Group V elements in approximate stoichiometric quantities, or, as is more commonly expressed, in equal atomic proportions of each element, i.e., an atomic proportion of 0.5 each. Normally, the material is formed in a crucible or boat, usually of graphite or quartz, and crystals of the compound are grown. The crystals are then cut into wafers from which semiconductor devices may be fabricated.

As will be appreciated by the art, it is preferable that crystal semiconductor bodies thus prepared have a substantial area with a regular shape so that many semiconducting devices may be fabricated from one piece without loss or waste of material, each of the devices thereby also having the same size and substantially identical physical properties. These attributes are most readily realized in a crystal which has a large and regular surface area. Furthermore, as the art will appreciate, it is also desirable that the crystal be relatively thin in order to eliminate additional cutting operations which would be required with thick crystals. Crystal semiconductor materials presently available to the art are notedly deficient in one or more of the these characteristics.

In a copending application, Serial No. 140,164 filed September 18, 1961 by H. R. Barkemeyer, W. J. McAleer and P. I. Pollak, inventors of this application, there is described the discovery of a novel form of crystal semiconductor material having the aforementioned desirable crystal shape, that is, being elongated with appreciable area and substantially planar upper and lower surfaces. This form of semiconductor material is known as "crystal blades," or otherwise as "crystal ribbons" of the semiconductor material. As is described in detail in the aforementioned copending application, a method is provided for the preparation of the crystal blades wherein a closed reaction chamber is charged with suitbale reactants and heated in a predetermined manner to effect formation of the novel crystal blades of the semiconductor within the reaction chamber.

In the earlier process, the reactants in a predetermined concentration are maintained within a sealed reaction chamber during heating. What is described herein on the other hand, is a novel process of preparing crystal blades by a continuous flow technique in an open tube reaction vessel. By this process there is provided the desired form of semiconductor material in a continuous and in a more economical and efficient manner.

Accordingly, it is an object of the present invention to provide a novel method of making crystal blades of semiconductor material.

Another object of this invention is to provide crystal blades of semiconductor material by a continuous, open tube process.

Still another object is to provide apparatus for preparing crystal blades of semiconductor material by an open tube process.

Figure 2:
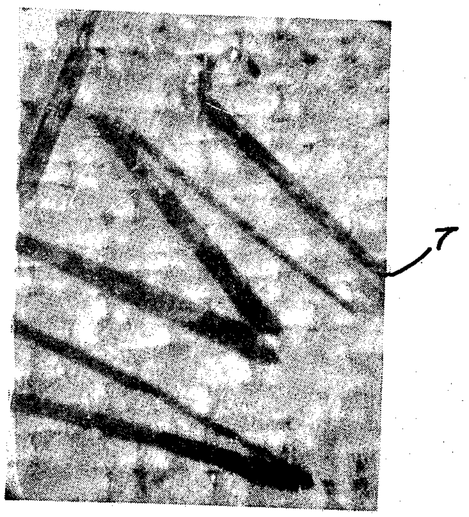

These and other objects will be made apparent from the following more detailed description of the invention, in which reference will be made to the accompanying drawings, in which:

FIGURE 1 is a schematic diagram of the apparatus used in the method of the present invention; and FIGURE 2 is a photograph of crystal blades of gallium phosphide prepared in accordance with the method of the present invention.

In accordance with the present invention there is provided a method of making crystal blades of semiconductor material including germanium, silicon, silicon carbide, and Group III–V compounds of the general formula $$(A_xB_{1-x})^{III}(C_yD_{1-y})^{V}$$

where A and B are different elements but both of Group III, i.e., boron, aluminum, gallium, indium or thallium, and C and D are different elements but both of Group V, i.e., nitrogen, phosphorus, arsenic, antimony or bismuth; were subscripts $x$ and $y$ denote atom proportions whose values can change from zero to unity, inclusive.

As a feature of the present invention there is provided a method of preparing crystal blades of these semiconductor materials in a continuous manner. Accordingly, the method includes charging an open reaction chamber with the element or elements of the specific compound to be formed and thereupon passing a suitable transport agent through the so-charged reaction chamber while the latter is maintained at elevated temperatures, thereupon forming the desired semiconductor blades in a cooler region of the reaction chamber.

In an illustrative preferred embodiment of the present invention, crystal blades of gallium phosphide are formed by first providing a predetermined quantity of elemental gallium in an elongated reaction chamber of sufficient length so that a predetermined fractional vapor precipitation of crystal blades may occur in a given length of the chamber. Thereafter phosphorous trichloride is passed over the thus-heated gallium material, thereupon to form crystal blades only of gallium phosphide in the predetermined portion of the chamber.

Referring now to FIGURE 1, there is shown schematically suitable apparatus for forming the crystal blades of semiconductor material according to the method of the present invention. The apparatus includes an elongated reaction chamber 1 which is formed of a suitable material, such as quartz, and is in the form of an open tube. Surrounding the tube is a furnace 2 which may be used to present the temperature within the reaction chamber in a given manner. For example, a temperature profile may be maintained within the furnace such that one portion is heated to an elevated temperature while another portion is maintained at a lower temperature. The furnace may conveniently comprise an electrical insulating ceramic shell such as alundum in which are embedded resistance heating wires, spirally found, all forming a cylindrical heating device within the reaction chamber may be positioned. The resistance heating wire of the furnace may be connected to a source of electrical energy (not shown) through each of the furnace's individual terminal wires and a globar oven 3 is provided for the deposition area of the chamber.

For purposes of clarity only and not as a limitation thereof, the following description of the process of the present invention will be described with particular reference to the formation of crystal blades of Group III–V compounds.

Into the reaction chamber 1 is introduced an elemental constituent of the semiconductor, illustrated as 4, contained within a boat 5, suitably one made of viterous carbon material. A supply line, generally indicated as 6, is provided at the inlet part of the open tube furnace for the admission of gaseous reactants into the reaction chamber. For example, if we desire to form crystal blades of gallium phosphide, a source of phosphorous halide, such as phosphorous trichloride, is then admitted into the reaction chamber in which is contained a quantity of elemental gallium. The desired crystal blades 7 of semiconductor material are formed only in the cooler regions of the elongated tube indicated generally as 8.

The buildup of these blade crystals may continue for an extended period of time without interruption as long as the source material is not completely depleted, thereby providing a highly economical method for the preparation of such blades.

The formation tof gallium phosphide blades in accordance with the process of the present invention is believed to involve the following reaction sequence.

A. (1) $PCl_3 + \frac{3}{2}H_2 \rightarrow P + 3HCl$ (2) $6HCl + 3Ga \rightarrow GaCl + GaCl_2 + GaCl_3 + 3H_2$ B. (1) $GaCl + P \rightarrow GaP + GaCl_3$ Steps in A involve thermal reactions while B is a disproportionation reaction.

As another feature of the invention, the exit region 9 is heated to an elevated temperature in the order of 1050° C. by furnace 10, in order to volatalize the solid products formed therein, thus preventing clogging of the exit line after the run has continued for an extended period.

In order to form a substantial quantity of crystal blades of gallium phosphide which can be readily separable from any other crystal habit which may form as a by-product of the reactions, it is necessary that an elongated reaction chamber be used.

Since the crystal habit formed is determined by the concentration of the reactants or the super-saturation within the vapor phase, a long tube provides an opportunity for fractional vapor deposition of different crystal habits at different junctions along the tube. For example, near the inlet when the concentration of reactants is a maximum, heavy granular deposit 11 is observed. As the concentration decreases within region 8, more nearly ideal conditions are present for deposition of crystal blades of the semiconductor. Then whiskers 12 are found in the next region of the elongated tube. At the exit region 9 what is observed are deposits of gallium halide polymers, gallium halides themselves and other unidentified side products.

The amount of gallium must be insufficient to dissolve any gallium phosphide formed in the vicinity thereof. For example, when about 2 g. of gallium metal is contained in a boat having the dimensions 2″ x 0.5″ x 0.5″, substantially all of the gallium phosphide produced in the run is deposited on the walls of the tube and region 8 as crystal blades. On the other hand, when a charge of 20 g. of gallium metal is used in the same container, the gallium phosphide is found dissolved in the excess gallium.

The invention will be illustrated with specific reference to certain illustrative embodiments thereof.

*Example I*

2.0 grams of high purity gallium metal of semiconductor grade is charged in a 2″ long vitreous carbon boat and inserted in a 1″ O.D. quartz tube which, in turn, is inserted in an 18″ globar furnace preset at 1000° C. and having a flat temperature profile dropping off sharply at a point 3″ from each end of the furnace. The quartz tube then is connected to a gas entrance line and a gas exit line. Hydrogen then is passed through the system at 170 ml./min. for two hours in order to remove moisture and oxide films on the molten gallium. A flask which is charged with 150 ml. of reagent grade phosphorous trichloride is immersed in ice water at 0° C. Then helium gas is passed through the phosphorous trichloride at 70 ml./min. for 2½ hours. The vapor pressure of phosphorous trichloride at 0° C. is 35 mm. At the end of the run there are observed crystallized blades of gallium phosphide near the exist part of the tube. The gas input feed is then switched to helium and the tube is cleaned of excess phosphorous trichloride and gallium chloride which are formed during the reaction. The tube is then removed while excluding air, and cooled to room temperature and the gallium phosphide crystallized blades are removed.

*Example II*

Following the procedure described in detail above and using arsenic in place of phosphorous, there are obtained crystal blades of gallium arsenide instead of gallium phosphide.

*Example III*

Following the procedure described in detail above and using indium in place of gallium, there is produced indium phosphide instead of gallium phosphide.

*Example IV*

Following the procedure described in detail above and using silicon in place of gallium and hydrogen chloride in place of phosphorous trichloride, there are produced crystal blades of silicon.

*Example V*

Following the procedure described in detail above and using germanium in place of gallium and hydrogen chloride in place of phosphorous trichloride, there are produced crystal blades of germanium.

*Example VI*

Following the procedure described in detail above in Example I and using a mixed stream of phosphorous trichloride and arsenic trichloride in place of phosphorous trichloride alone, there is produced a gallium arsenide phosphide alloy.

What is claimed is:

1. The method of forming crystal blades of gallium phosphide in a continuous manner which comprises charging an open elongated reaction chamber with about 2 grams of elemental gallium, heating said gallium to a temperature of about 1025° C., contacting said gallium with phosphorous trichloride in a helium gas stream formed by passing helium gas over liquid phosphorous trichloride maintained at 0° C. at a flow rate of 170 ml./min., thereby to effect formation of gallium phosphide within the cooler regions of the tube at about 850° C., and removing the side products of the formation of gallium phosphide by heating the exit region of the chamber to about 1000° C.

2. The method of forming crystal blades, in a continuous manner by vapor deposition of semiconductor material, which are readily isolatable from other crystal habits also formed during the process, of a compound of the general formula $$(A_xB_{1-x})^{III}(C_yD_{1-y})^{V}$$

where A and B are gallium and indium, respectively, and C and D are arsenic and phosphorus, respectively, and where subscriptions $x$ and $y$ denote atom proportions whose values are zero to one, inclusive, said method comprising:

(a) charging a reaction chamber which is of elongated shape and open at its two ends, with the Group III metallic element of the specific semiconductor material to be formed, said element being charged in said chamber near the first open end thereof, with the second open end located at such a distance away from the charged element that fractional precipitation of a vaporous product of reaction between the charged element and a vapor introduced into the chamber at the first open end may occur along said chamber as said vaporous product of reaction passes toward the second open end of the chamber;

(b) introducing into said reaction chamber, at said first open end, a flow of a vaporized compound of the Group V element of the specific semiconductor material to be formed and of a carrier gas selected from the group consisting of hydrogen, helium and argon, and passing said flow over said Group III metallic element charged in said chamber;

(c) heating the portion of said reaction chamber in the area of the charge of said Group III metallic element to an elevated temperature so that a resulting product of the reaction of the vapor flow introduced in the first open end with the Group III metallic element is the desired semiconductor material in vapor phase;

(d) heating the intermediate portion of the reaction chamber, from the area of the charge to near the second open end thereof, to a temperature less than that in the area of the charge so as to effect precipitation in such portion of the desired semiconductor material from the vapor phase, the temperature of such portion, along its length from the area of the charge to near the second open end, decreasing gradually so that fractional precipitation of different crystalline habits of said desired semiconductor material deposit along such portion;

(e) heating the end portion of the reaction chamber in the vicinity of the second open end thereof to two significantly different temperatures, the area of such end portion closer to the first open end being heated to a temperature significantly lower than the temperatures in the intermediate portion so as to produce a sharp drop in temperature as the vapors in said reaction chamber move from the intermediate portion of the chamber to the end portion thereof, and thereby cause the precipitation from the vapor phase of the desired semiconductor material in its crystalline habit resulting from rapid cooling, the remaining area of the end portion of the reaction chamber, in the immediate vicinity of the second open end thereof, being heated to a temperature higher than the temperatures in the intermediate portion to insure volatilization of the solid by-products of the reaction so that, as the by-products of the reaction pass out the second open end of the reaction chamber, there is no clogging of the second open end; and (f) collecting the desired blade form of the desired semiconductor material from the central part of the intermediate portion of the reaction chamber.

3. The method in accordance with claim 2, wherein the quantity of said metallic element charged into the reaction chamber is insufficient to dissolve the desired semiconductor material formed within said chamber.

4. The method in accordance with claim 3, wherein the desired semiconductor material is gallium phosphide.

5. The method in accordance with claim 4, wherein the vaporized compound of the Group V element is phosphorous trichloride.

6. The method in accordance with claim 5, wherein a gallium subchloride is an intermediate product of the reaction and such gallium subchloride reacts with the phosphorous released from the phosphorous trichloride to form gallium phosphide in vapor form.

References Cited by the Examiner

UNITED STATES PATENTS

| | | | |
|---|---|---|---|
| 2,858,275 | 10/1958 | Folberth | 252—62.3 |
| 2,902,350 | 9/1959 | Jenny et al. | 148—1.6 |
| 3,145,125 | 8/1964 | Lyons | 252—62.3 |
| 3,224,913 | 12/1965 | Ruehrwein | 252—62.3 |

OSCAR R. VERTIZ, *Primary Examiner.*

H. S. MILLER, *Assistant Examiner.*